United States Patent [19]

Simper

[11] Patent Number: 5,427,705
[45] Date of Patent: Jun. 27, 1995

[54] SALT COMPOSITION CONTAINING CALCIUM MAGNESIUM ACETATE AND SODIUM SILICATE

[75] Inventor: Jack L. Simper, Murray, Utah

[73] Assignee: Chemopharm Laboratory Inc., Salt Lake City, Utah

[21] Appl. No.: 276,680

[22] Filed: Jul. 18, 1994

Related U.S. Application Data

[63] Continuation of Ser. No. 969,120, Oct. 30, 1992, abandoned, which is a continuation of Ser. No. 712,924, Jun. 7, 1991, abandoned.

[51] Int. Cl.$^6$ ............................................... C09K 3/18
[52] U.S. Cl. .......................................... 252/70; 106/13
[58] Field of Search ............................ 252/70; 106/13

[56] References Cited

U.S. PATENT DOCUMENTS

| | | | |
|---|---|---|---|
| 4,444,672 | 4/1984 | Gancy | 252/70 |
| 4,588,512 | 5/1986 | Rippie | 252/70 |
| 4,606,835 | 8/1986 | Lieber et al. | 252/70 |

FOREIGN PATENT DOCUMENTS 37810 2/1986 Hungary.
53-13179 5/1978 Japan.

OTHER PUBLICATIONS

Fujii et al, "Effect of calcium magnesium acetate on the freezing and thawing behavior of hardened cement paste", CA 109(18):155034g, 1987, no month available.

*Primary Examiner*—Christine Skane
*Attorney, Agent, or Firm*—Eleanor V. Goodall; Christiansen Jon C.; Daniel P. McCarthy

[57] ABSTRACT

The inventive composition contains salt, calcium magnesium acetate (CMA) and sodium silicate, and may optionally contain sodium ferrocyanide, diatomaceous earth, and/or other materials. The composition is useful for facilitating the melting and removal of snow and ice, and is stable and non-corrosive. The inclusion of both CMA and sodium silicate in the salt composition provides better corrosion resistance than can be obtained by the inclusion of comparable quantities of either CMA or sodium silicate alone. The inventive salt composition is considerably less expensive to manufacture than CMA-containing salt compositions which provide comparable corrosion resistance.

12 Claims, No Drawings

SALT COMPOSITION CONTAINING CALCIUM MAGNESIUM ACETATE AND SODIUM SILICATE

This application is a continuation of application Ser. No. 07/969,120, filed Oct. 30, 1992, now abandoned, which is a continuation of application Ser. No. 07/712,924, filed Jun. 7, 1991, now abandoned.

INTRODUCTION

My invention relates to a new and useful composition of matter. More specifically, it relates to a new and useful salt composition.

Salt compositions can be used to facilitate (by lowering melting temperature) the melting and removal of snow and ice from parking lots, roads, sidewalks, driveways, and numerous other paved areas. When used for this purpose, the salt composition is typically applied over the area covered by snow or ice. The salt composition can also be applied to the paved area at the beginning of the storm to make snow or ice removal easier.

Salt compositions of this type typically contain corrosion inhibitors and anticaking agents. The corrosion inhibitors serve to prevent or reduce damage to concrete and other surfaces, and to materials such as metals and leather which may come into contact with the salt composition. The anticaking agents prevent or reduce caking of the composition and increase its shelf life.

The addition of alkaline materials such as, for example, triethanolamine or silicate to salt compositions serves to inhibit corrosion caused by the salt composition. The inclusion of silicate in salt compositions used for road de-icing or in related compositions, in order to reduce the corrosiveness of the composition, has been described in U.S. Pat. Nos. 1,141,446, 2,574,763, 3,996,399 and 4,606,835. It is thought that both the deposition of silica on surfaces and the formation of an iron oxide coating on steel (due to the high alkalinity of silicate) serve to inhibit corrosion.

Calcium magnesium acetate, referred to as CMA, has been used by itself as a de-icing compound, or in combination with sodium chloride. CMA possesses a number of desirable properties; it is effective, non-corrosive, and safe for the environment. It is believed that CMA provides protection from corrosion by reacting with carbonate in pavement, metallic surfaces, and so on to form a coating of calcium carbonate which protects the surface from corrosion. Results of corrosion tests obtained with CMA-containing snow-melting/de-icing compositions, published by the Southwest Research Institute (Machowski, J. J., F. F. Lyle Jr., Comparative Evaluation of Deicer Corrosion, Southwest Research Institute project No. 06-2033-001, 18 Mar. 1988), indicate that these compositions are both effective and non-corrosive. However, no compositions of this type are commercially available. The high cost of CMA makes the use of compositions which contain substantial amounts of CMA impractical.

The inventive salt composition described herein includes both calcium magnesium acetate (CMA) and a silicate. It has generally been believed, based on basic chemical principles, that CMA cannot be used in salt compositions in combination with silicate because the two materials will react to form calcium silicate or magnesium silicate, compounds which are insoluble in water and hence ineffective for snow removal/de-icing. I have discovered a method by which it is possible to combine CMA and silicate in a salt composition and obtain a composition which is stable and which possesses desirable properties.

A greater degree of corrosion resistance can be attained by the addition of both CMA and silicate to salt compositions than can be attained by the addition of either silicate or CMA alone. A quantity of CMA added to a salt composition which contains silicate provides a degree of corrosion resistance essentially equal to the corrosion resistance provided by a significantly larger quantity of CMA added to a comparable salt composition which does not contain silicate. My inventive salt composition, which includes both CMA and silicate, provides effective and non-corrosive snow removal/de-icing at a lower cost than was previously possible, as a consequence of using a much smaller amount of CMA.

The mechanism by which the combination of CMA and silicate provide better corrosion resistance is thought to be as follows: when the salt composition is spread on pavement (or some other surface) and exposed to snow or ice, the CMA and silicate go into solution and react to form calcium silicate and magnesium silicate. Because the CMA and silicate are not particularly hygroscopic, this reaction does not take place when the dry salt composition is stored. The calcium and magnesium silicate are deposited on metal or pavement as a hard, protective coating which inhibits corrosion. The calcium silicate film formed when CMA and silicate are used in the salt composition is harder than the calcium carbonate formed when only CMA is used, and may provide greater protection for the coated material.

BRIEF SUMMARY OF INVENTION

A salt composition containing calcium magnesium acetate (CMA) and sodium silicate effective for the removal of snow and ice from roads, sidewalks, and other pavement is described. The CMA and silicate provide corrosion resistance. The composition is stable, effective, inexpensive, and as non-corrosive as much more expensive (and hence not commercially feasible) compositions.

DETAILED DESCRIPTION

The composition of our invention contains salt (sodium chloride), calcium magnesium acetate (CMA), and sodium silicate. The composition may optionally contain triethanolamine (TEA), sodium ferrocyanide, and diatomaceous earth; the preferred embodiment of the composition includes these ingredients, but they may be omitted or replaced by other components without departing from the essential nature of the invention.

It is preferred that medium grade salt (sodium chloride) is used in the composition. Another salt, such as potassium chloride, may be used in place of sodium chloride. The salt can be coarse or fine, and can be granular form, flake form, or any other form. This invention is not limited by the size or form of the salt.

The calcium magnesium acetate which I have used in the preferred embodiment of the inventive composition was obtained from Chevron. However, it is not intended that the practice of the invention should be limited to the use of CMA obtained from any particular source, and CMA from other sources should be understood to fall within the inventive composition.

It is recommended that the sodium silicate used in the inventive composition have a silicon dioxide:sodium oxide ratio ranging from 1:1 to 2.5:1. In general, it is most preferable that a sodium silicate with a 1:1 ratio of silicon dioxide:sodium oxide (i.e. sodium metasilicate) be used, as it seems to provide better corrosion resistance. However, in cases where it is desirable to use a composition which is less alkaline, a higher ratio of silicon dioxide to sodium oxide (up to 2.5:1) may be used. Sodium silicate should preferably be fines (smaller than 65 mesh), although fine granular (18–60 mesh) sodium silicate could be used. Sodium metasilicate fines can be obtained from Crosfield Chemicals.

The TEA serves to inhibit corrosion; in addition, the TEA, which is a thick liquid, tends to coat the silicate particles and reduces their contact with the CMA, thus limiting the possibility of reaction of the silicate with the CMA. TEA can be obtained from Union Carbide or Dow. It is preferred that 99% TEA be used, but my invention is not limited to this particular grade of TEA.

Although diatomaceous earth is preferred, any one or more of the following or their equivalents can be used in place of (or along with) diatomaceous earth:calcium silicate, fumed silica, powdered bentonite, talc and starch. Each of the foregoing is within the scope of our invention. The diatomaceous earth used in the preferred embodiment of the invention is Celatom FW14 obtained from Eagle-Picher Industries.

Although the broadest scope of our invention is not limited thereto, the following quidelines are offered to assist in the practice of our invention and in determining the amount of each component generally used in the inventive composition. As used herein and in the claims, "parts" means parts by weight of the component per 100 parts by weight of salt. In the following description, the proportions of each component of the composition are given as number of parts by weight relative per 100 parts by weight of salt in the composition.

Salt will preferably make up at least 80% of the composition. In the most preferred embodiment of the invention, salt makes up about 95% of the composition.

The quantity of CMA will preferably be less than about 30 parts per 100 parts of salt and greater than about 2.5 parts per 100 parts of salt, by weight. More preferrably said range is less than about 20 parts and more than about 2.5 parts of CMA per 100 parts of salt, by weight. The preferred embodiment of the invention will contain about 3.68 parts CMA by weight per 100 parts salt by weight.

The amount of sodium silicate per 100 parts salt (by weight) will preferably be between about 0.1 parts to about 3.8 parts and most preferably will be about 0.53 parts per 100 parts salt by weight.

The amount of triethanolamine per 100 parts salt (by weight) will preferably be between about 0.01 parts to about 6.3 parts and most preferably will be about 1.05 parts per 100 parts salt by weight.

The amount of sodium ferrocyanide per 100 parts salt (by weight) will preferably be between about 0.05 parts to about 0.2 parts and most preferably will be about 0.11 parts per 100 parts salt by weight. The sodium ferrocyanide prevents caking of the salt composition, thus maintaining the free-flowing consistency of the composition, but it does not contribute to the ice/snow-melting or corrosion resistant functions of the inventive composition.

My quidelines call for less than 20 parts diatomaceous earth per 100 parts salt by weight. I recommend less than 8 parts and prefer less than 4 parts of diatomaceous earth. My guidelines further call for at least about 0.1 parts of diatomaceous earth per 100 parts of salt. The quantity of diatomaceous earth used will most preferably be about 0.53 parts per 100 parts salt by weight.

The preferred composition of the invention is summarized in Table 1 below.

TABLE 1

| PREFERRED COMPOSITION | |
|---|---|
| Component | Parts by weight |
| Salt | 100.00 |
| CMA | about 3.68 |
| Sodium Silicate | about 0.53 |
| Triethanolamine | about 1.05 |
| Sodium Ferrocyanide | about 0.11 |
| Diatomaceous Earth | about 0.53 |

Although the broadest scope of our invention is not limited thereto, the following quidelines are offered to assist in the practice of our invention and in particular the manufacture of the composition from the components described above. It is recommended that the following steps be followed in the manufacture of the inventive composition: The diatomaceous earth, silicate, sodium ferrocyanide and TEA are combined to produce a moist, semi-liquid mixture. This mixture is then spread over the salt and mixed in to coat the grains of salt. The CMA is added to the mixture last and mixed in. The resulting mixture is stable, free flowing, and does not cake.

If the practitioner of my invention favors relatively higher amounts of CMA for certain applications, e.g., roads, parking terraces, etc., the amount of CMA can range from about 30 to 300 parts of CMA per 100 parts of salt, by weight. (Even more CMA can be used but is disfavored). If relatively higher amounts of CMA are used, the ranges applicable to sodium silicate and triethanolamine should be increased. Accordingly, the preferred range under such circumstances is about 2.5 to about 40 parts of sodium silicate per 100 parts of salt, by weight. Similarly, the preferred range under such circumstances is about 0.01 to about 24 parts of triethanolamine per 100 parts of salt, by weight. The relative amounts of other components may be increased or adjusted by the practitioner as desired.

EXAMPLES

The following examples are provided to illustrate the improvement in corrosion resistance, in comparison to other snow and ice melting compositions, provided by the preferred embodiment of the inventive composition. The first two tests measured corrosion of steel and aluminum. The final test measured corrosion of concrete. In the metal corrosion tests, the degree of corrosion was determined by measuring the amount of weight lost by the sample over the test period. Under some of the test conditions, the sample was observed to increase in weight; this weight increase is thought to be the result of the formation of a corrosion resistant oxide, carbonate, or silicate coating on the surface of the sample. Thus a small weight loss, or a weight gain, indicate better corrosion resistance than does a large weight loss.

The following ice-melters were tested:
1) salt (sodium chloride)
2) pure CMA
3) a composition of 100 parts salt and 25 parts CMA
4) a composition of 100 parts salt, 3.68 parts CMA, 0.53 parts triethanolamine and 0.53 parts diatomaceous earth. This composition is nearly the same as the preferred composition but does not include silicate or sodium ferrocyanide. It is labelled "3.5% CMA mixture" in the tables.

5) a composition of 100 parts salt, 3.68 parts CMA, 0.53 parts sodium silicate, 0.53 parts triethanolamine, and 0.53 parts diatomaceous earth. This composition is nearly the same as the preferred composition but does not include sodium ferrocyanide. It is labelled "3.5% CMA mixture+silicate" in the tables.

The ice-melter compositions were manufactured according to the steps described above, with each ingredient added in the specified proportions. In test A, 10% solutions of the ice melters were used; this is a standard solution strength used in corrosion tests. In tests B and C, quantities of ice melter and ice were used which produced 10% solutions when the ice had melted. Tap water was used as a control.

Test A

Accurately weighed 2×2 inch steel and aluminum coupons were submerged in 10% solutions of various ice melters in tap water, or in tap water alone, for a period of one week. At the end of the week the coupons were weighed, and the final weight was subtracted from the initial weight to give the weight loss. Yearly corrosion was calculated as mg weight loss per square inch, and is shown in Table 2 below.

TABLE 2

|  | Weight Loss (mg/inch$^2$/year) | |
| --- | --- | --- |
|  | Steel | Aluminum |
| Tap Water | 130 | wt. gain |
| Salt | 70 | 26 |
| 3.5% CMA mixture | 35 | 27 |
| 25 CMA : 100 Salt | 1.0 | 19 |
| CMA | wt. gain | wt. gain |

Test B

2×2 inch steel and aluminum coupons were placed in a petri dishes. Each coupon was covered with 50 ml tap water and the sample was allowed to freeze overnight. 5 g of an ice melting compound was applied to the frozen sample and the sample was allowed to thaw completely at 4° C. After 5 hours the brine (water and ice melter) was poured off and the sample was returned to the refrigerator. 24 hours later, tap water was added again and allowed to freeze overnight. After the process had been repeated 10 times, the samples were weighed again, and weight loss was calculated. Weight loss measurements are shown in Table 3. A plus (+) sign in front of a value indicates that weight was gained, presumably due to accumulation of a protective coating.

TABLE 3

|  | Weight Loss (mg/10 days) | |
| --- | --- | --- |
|  | Steel | Aluminum |
| Tap Water | 25.5 | +2.3 |
| Salt | 70.9 | +2.8 |
| 3.5% CMA mixture | 46.6 | +5.6 |
| 3.5% CMA mixture + silicate | 4.1 | +27.3 |
| CMA | +9.0 | +14.1 |

Test C

The final test compared the effects of various ice-melter compositions on cured concrete samples. Concrete was prepared from commercially available sand mix. Concrete samples were 2½" diameter, 1" thick and fit tightly into plastic jars. The concrete samples were covered with 50 ml of tap water and the jars were place in the freezer overnight. 5 grams of ice-melter were spread over the ice and thawing was allowed to take place. After 5-8 hours the brine was poured off, and the samples were covered with 50 ml of fresh tap water and refrozen. The procedure was repeated every day for 60 days. The appearance of the concrete samples after 60 days is described Table 4.

TABLE 4

|  | Appearance of Concrete |
| --- | --- |
| Tap Water | no visible damage |
| Salt | visible surface damage; edge corners severely corroded |
| 3.5% CMA mixture | visible surface damage; edge corners moderately corroded |
| 3.5% CMA mixture + silicate | visible white film on surface; no surface damage |
| 25 CMA : 100 Salt | visible white film on surface; no surface damage |
| CMA | visible white film on surface; no visible damage |

The results of the three tests show that the salt composition which contains 3.5% CMA (3.68 parts CMA to 100 parts salt) and sodium silicate produces significantly less corrosion than salt alone, or the salt composition which contains 3.5% CMA but no silicate. The salt composition which contains 3.5% CMA and sodium silicate gives corrosion resistance comparable to that obtained with a composition of 25 parts CMA and 100 parts salt.

STABILITY OF THE SALT COMPOSITION

The inventive salt composition, which contains both sodium silicate and CMA, has been stored for as long as a month and no reaction between the sodium silicate and CMA (to form calcium silicate or magnesium silicate) was observed. It is thought that this is because CMA is not very hygroscopic, and hence does not absorb enough water from the atmosphere to go into solution, which would make it possible for the reaction to take place.

The foregoing description of the invention so fully reveals the general nature and the innovations and advantages of the invention that others can readily modify such invention and/or adapt it for various applications without departing from its general concepts, and, therefore such adaptations and modifications should be and are intended to be comprehended within the meaning and range of the claims appended hereto and their equivalents, which claims define subject matter regarded to be the invention described herein.

I claim:

1. A salt composition useful for facilitating the melting and removal of snow and ice comprising:
   (a) salt;
   (b) sodium silicate;
   (c) calcium magnesium acetate;
wherein said salt is selected from the group consisting of sodium chloride and potassium chloride; wherein said salt is at least 80% by weight of the composition; wherein said sodium silicate is present in at least 0.1 parts per 100 parts salt; wherein the ratio of said calcium magnesium acetate to said sodium silicate is between about 0.66 and about 300; and wherein said calcium magnesium acetate is present in a quantity effective for inhibiting corrosion.

2. A salt composition as described in claim 1 wherein (b) comprises sodium silicate particles; and wherein said salt composition further comprises triethanolamine in an amount effective for thinly coating said sodium silicate particles.

3. A salt composition as described in claim 1 further comprising sodium ferrocyanide in an amount effective for inhibiting caking of said salt composition.

4. A salt composition as described in claim 1 further comprising at least one member selected from the group consisting of diatomaceous earth, calcium silicate, fumed silica, powdered bentonite, talc and starch; wherein said member is used in a quantity sufficient to prevent caking of said salt composition.

5. A salt composition useful for facilitating the melting and removal of snow and ice comprising:
 (a) salt,
 (b) from about 0.1 to about 10 parts by weight of sodium silicate per 100 parts by weight of salt, and
 (c) from about 2.5 to about 30 parts by weight of calcium magnesium acetate per 100 parts of salt by weight;
wherein said salt is selected from the group consisting of sodium chloride and potassium chloride.

6. A salt composition in accordance with claim 5 wherein (c) is about 2.5 to about 20 parts by weight of calcium magnesium acetate.

7. A salt composition as described in claim 6 wherein (b) is sodium metasilicate.

8. A salt composition as described in claim 6 further comprising from about 0.01 to about 6.3 parts by weight of triethanolamine per 100 parts of salt by weight.

9. A salt composition as described in claim 6 further comprising from about 0.05 to about 0.2 parts by weight of triethanolamine per 100 parts of salt by weight.

10. A salt composition as described in claim 6 further comprising from about 0.1 to about 20 parts by weight of at least one member selected from the group consisting of diatomaceous earth, calcium silicate, fumed silica, powdered bentonite, talc and starch, per 100 parts of salt by weight.

11. A salt composition as described in claim 5 further comprising:
 (d) from about 0.05 to about 0.2 parts by weight of sodium ferrocyanide per 100 parts of salt by weight,
 (e) from about 0.01 to about 6.3 parts by weight of triethanolamine per 100 parts of salt by weight, and
 (f) from about 0.1 to about 20 parts by weight of at least one member selected from the group consisting of diatomaceous earth, calcium silicate, fumed silica, powdered bentonite, talc and starch, per 100 parts of salt by weight.

12. A process for preparing a salt composition useful for facilitating the melting and removal of snow and ice comprising:
 (a) mixing together from about 0.1 to about 20 parts by weight diatomaceous earth, from about 0.1 to about 10 parts by weight sodium silicate, from about 0.05 to about 0.2 parts by weight sodium ferrocyanide and from about 0.01 to about 6.3 parts by weight triethanolamine to form a mixture;
 (b) spreading said mixture over 100 parts by weight salt;
 (c) mixing together said mixture and said salt in such a manner that particles of said salt become coated with said mixture; and
 (d) mixing from about 2.5 to about 30 parts by weight per 100 parts of salt by weight of calcium magnesium acetate into the salt mixture resulting from step (c);
wherein said salt is selected from the group consisting of sodium chloride and potassium chloride.

* * * * *